US010983397B2

(12) United States Patent
Zhou

(10) Patent No.: US 10,983,397 B2
(45) Date of Patent: Apr. 20, 2021

(54) PHASE FILM SUBSTRATE, MANUFACTURING METHOD THEREOF, DISPLAY DEVICE

(71) Applicant: BOE TECHNOLOGY GROUP CO., LTD., Beijing (CN)

(72) Inventor: Chunmiao Zhou, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 69 days.

(21) Appl. No.: 16/464,166

(22) PCT Filed: May 11, 2018

(86) PCT No.: PCT/CN2018/086511
§ 371 (c)(1),
(2) Date: May 24, 2019

(87) PCT Pub. No.: WO2018/205998
PCT Pub. Date: Nov. 15, 2018

(65) Prior Publication Data
US 2020/0301210 A1 Sep. 24, 2020

(30) Foreign Application Priority Data
May 12, 2017 (CN) .......................... 201710335037.3

(51) Int. Cl.
G02F 1/1337 (2006.01)
G02B 30/25 (2020.01)
(Continued)

(52) U.S. Cl.
CPC ...... G02F 1/133711 (2013.01); G02B 5/3033 (2013.01); G02B 30/25 (2020.01); G02F 1/133528 (2013.01); G02F 1/133788 (2013.01)

(58) Field of Classification Search
CPC ......... G02F 1/1334; G02F 2001/13345; G02F 2001/133633; G02F 1/13363;
(Continued)

(56) References Cited

U.S. PATENT DOCUMENTS 5,474,731 A 12/1995 Morikawa et al.
2004/0032548 A1 2/2004 Li et al.
(Continued)

FOREIGN PATENT DOCUMENTS

CN 101408632 A 4/2009
CN 102629000 A 8/2012
(Continued)

OTHER PUBLICATIONS

First Review Notice and English language translation, CN Application No. 201710335037.3, dated Oct. 12, 2018, 19 pp.
(Continued)

Primary Examiner — Jessica M Merlin
(74) Attorney, Agent, or Firm — Myers Bigel, P.A.

(57) ABSTRACT

Embodiments of the present disclosure provide a phase film substrate, a manufacturing method thereof, and a display device. The phase film substrate includes a base film and a liquid crystal polymer layer on the base film. The liquid crystal polymer layer includes a plurality of strip-shaped liquid crystal sub-layers arranged in parallel in a first direction of the base film. Widths of the plurality of strip-shaped liquid crystal sub-layers in the first direction gradually decrease from a center of the base film to edges of the base film in the first direction, and the first direction is a direction in which the phase film substrate receives force and extends when it is attached to a display panel.

18 Claims, 6 Drawing Sheets

(51) Int. Cl.
*G02B 5/30* (2006.01)
*G02F 1/1335* (2006.01)

(58) Field of Classification Search
CPC ... G02F 2001/133631; G02F 1/133636; G02F 2001/133638; G02F 2413/09; G02F 2001/13775; G02B 30/25; G02B 30/22
See application file for complete search history.

(56) References Cited

U.S. PATENT DOCUMENTS

| | | |
|---|---|---|
| 2006/0152656 A1 | 7/2006 | Kashima et al. |
| 2008/0170183 A1* | 7/2008 | Sugiyama ............... H04N 13/31 349/96 |
| 2016/0139314 A1 | 5/2016 | Inomata et al. |
| 2016/0246067 A1* | 8/2016 | Lee ........................ G02B 30/27 |

FOREIGN PATENT DOCUMENTS

| | | | |
|---|---|---|---|
| CN | 202748540 U | | 2/2013 |
| CN | 103529590 A | | 1/2014 |
| CN | 103941322 A | | 7/2014 |
| CN | 104345370 A | * | 2/2015 |
| CN | 105264408 A | | 1/2016 |
| CN | 106918863 A | | 7/2017 |
| JP | 2012181438 A | | 9/2012 |

OTHER PUBLICATIONS

Second Review Notice and English language translation, CN Application No. 201710335037.3, dated May 7, 2019, 7 pp.
International Search Report and Written Opinion of the International Searching Authority, International Application No. PCT/CN2018/086511, dated Aug. 1, 2018, 11 pp.

* cited by examiner

PHASE FILM SUBSTRATE, MANUFACTURING METHOD THEREOF, DISPLAY DEVICE

RELATED APPLICATION

The present application is the U.S. national phase entry of PCT/CN2018/086511, with an international filing date of May 11, 2018, which claims the benefit of Chinese Patent Application No. 201710335037.3, filed on May 12, 2017, the entire disclosure of which is incorporated herein by reference.

FIELD

The present disclosure relates to the field of 3D display applications, and particularly to a phase film substrate, a manufacturing method thereof, and a display device.

BACKGROUND

Light-polarized 3D technology is also referred to as polarized 3D technology, in which a displayed image is decomposed into two sets of images with different polarization directions in terms of vibration directions of light, and images with different polarization directions are acquired by left and right lenses of 3D glasses respectively, so that two different sets of images are received by left and right eyes of a viewer respectively and then synthesized into a stereoscopic image through a brain.

SUMMARY

An aspect of the present disclosure provides a phase film substrate comprising a base film, and a liquid crystal polymer layer disposed on the base film. The liquid crystal polymer layer includes a plurality of strip-shaped liquid crystal sub-layers arranged in parallel in a first direction of the base film, and widths of the plurality of strip-shaped liquid crystal sub-layers in the first direction gradually decrease from a center of the base film to edges of the base film in the first direction, the first direction being a direction in which the phase film substrate receives force and extends when attached to a display panel.

According to some embodiments of the present disclosure, the widths of the plurality of strip-shaped liquid crystal sub-layers in the first direction decrease linearly from the center of the base film to the edges of the base film in the first direction.

According to some embodiments of the present disclosure, the display panel comprises multiple rows of pixel units arranged in parallel in the first direction, the multiple rows of pixel units have equal widths in the first direction, and each strip-shaped liquid crystal sub-layer corresponds to m rows of pixel units, m being an integer not less than 1.

According to some embodiments of the present disclosure, m=1, a width of a strip-shaped liquid crystal sub-layer located at the center of the base film in the first direction is equal to a width of one row of pixel units in the first direction, and the strip-shaped liquid crystal sub-layer located at the center of the base film is a strip-shaped liquid crystal sub-layer closest to the center of the base film. A width Di of an i-th strip-shaped liquid crystal sub-layer in the first direction which is successively arranged from the center of the base film to the edges thereof in the first direction and not located at the center of the base film satisfies a width calculation formula:

$$Di = D - i*2(p-a)/[(n+1)*n],$$

wherein D is the width of the strip-shaped liquid crystal sub-layer located at the center of the base film in the first direction, p is a width of one pixel unit in the first direction, a is a width of an opening of one pixel unit in the first direction, and n is a total number of strip-shaped liquid crystal sub-layers which are located on a side of the center of the base film in the first direction and not located at the center of the base film.

According to some embodiments of the present disclosure, the base film is a rectangular base film, and the plurality of strip-shaped liquid crystal sub-layers are symmetrically distributed, a symmetry axis being a straight line in a second direction where the center of the base film resides, the second direction being perpendicular to the first direction.

According to some embodiments of the present disclosure, the plurality of strip-shaped liquid crystal sub-layers include a plurality of left-handed liquid crystal sub-layers configured to generate left-handed circularly polarized light and a plurality of right-handed liquid crystal sub-layers configured to generate right-handed circularly polarized light, the plurality of left-handed liquid crystal sub-layers and the plurality of right-handed liquid crystal sub-layers being arranged in parallel and alternately in the first direction.

According to some embodiments of the present disclosure, the phase film substrate further comprises an alignment layer disposed between the base film and the liquid crystal polymer layer.

Another aspect of the present disclosure provides a method for manufacturing a phase film substrate, comprising: providing a base film; and forming a liquid crystal polymer layer on the base film. The liquid crystal polymer layer includes a plurality of strip-shaped liquid crystal sub-layers arranged in parallel in a first direction of the base film, and widths of the plurality of strip-shaped liquid crystal sub-layers in the first direction gradually decrease from a center of the base film to edges of the base film in the first direction, the first direction being a direction in which the phase film substrate receives force and extends when attached to a display panel.

According to some embodiments of the present disclosure, forming a liquid crystal polymer layer on the base film includes: forming a liquid crystal polymer on the base film; and irradiating different regions of the liquid crystal polymer with laser light having a polarization direction of 45 degrees and laser light having a polarization direction of W degrees respectively, such that the liquid crystal polymer forms liquid crystal polymer layers configured to generate left-handed circularly polarized light and right-handed circularly polarized light respectively, W being one of −45 and 135.

According to some embodiments of the present disclosure, a distance between a laser that generates the laser light and the base film gradually decreases from the center of the base film to the edges of the base film in the first direction.

According to some embodiments of the present disclosure, a luminous flux of laser light irradiating on the liquid crystal polymer gradually decreases from the center of the base film to the edges of the base film in the first direction.

According to some embodiments of the present disclosure, forming a liquid crystal polymer layer on the base film includes: forming an alignment film polymer layer on the base film; performing rubbing alignment on the alignment film polymer layer to obtain an alignment layer; forming, on the alignment layer, a liquid crystal polymer where ultraviolet light alignment can be performed; and subjecting different regions of the liquid crystal polymer to exposure with a polarization direction of 45 degrees and exposure with a polarization direction of W degrees respectively using ultraviolet light, such that the liquid crystal polymer forms liquid crystal polymer layers configured to generate left-handed circularly polarized light and right-handed circularly polarized light respectively, W being one of −45 and 135.

According to some embodiments of the present disclosure, forming a liquid crystal polymer layer on the base film includes: forming a photosensitive alignment layer on the base film; subjecting different regions of the photosensitive alignment layer to exposure with a polarization direction of 45 degrees and exposure with a polarization direction of W degrees respectively using ultraviolet light, W being one of −45 and 135; forming a liquid crystal polymer on the photosensitive alignment layer after exposure; and curing the liquid crystal polymer such that the liquid crystal polymer forms liquid crystal polymer layers configured to generate left-handed circularly polarized light and right-handed circularly polarized light respectively.

According to some embodiments of the present disclosure, the different regions include a first region and a second region, the first region and the second region being arranged in parallel and alternately in the first direction.

According to some embodiments of the present disclosure, a distance between a light emitter that generates the ultraviolet light and the base film gradually decreases from the center of the base film to the edges of the base film in the first direction.

According to some embodiments of the present disclosure, a luminous flux of ultraviolet light irradiating on the liquid crystal polymer gradually decreases from the center of the base film to the edges of the base film in the first direction.

A further aspect of the present disclosure provides a display device comprising a display panel and a phase film substrate attached to a light exit surface of the display panel. The phase film substrate is any of the phase film substrates described above.

It is to be understood that the above general description and the following detailed description are merely exemplary and are not intended to limit the present disclosure.

BRIEF DESCRIPTION OF THE DRAWINGS

In order to more clearly illustrate embodiments of the present disclosure, the drawings needed for description of the embodiments will be briefly described below. It is apparent that the drawings in the description below are only some of the embodiments of the present disclosure, and other drawings may be further obtained by those skilled in the art based on these drawings without spending inventive efforts.

The accompanying drawings are incorporated in and constitute a part of the specification, illustrate embodiments of the present disclosure, and serve to explain the principles of the present disclosure together with the specification.

DETAILED DESCRIPTION

To make the objective, technical solutions and advantages of the present disclosure clearer, the present disclosure will be further described in detail below with reference to the accompanying drawings. It is apparent that the described embodiments are merely a part of embodiments of the present disclosure, rather than all of them. All other embodiments obtained by those ordinarily skilled in the art based on the embodiments of the present disclosure without spending inventive efforts fall within the scope of the present disclosure.

Typically, a phase film substrate (also referred to as Film-type Patterned Retarder, FPR) is attached to a light exit surface of a display panel of a 3D display device. The phase film substrate comprises a base film, an alignment layer, and a liquid crystal polymer layer, and is capable of decomposing a displayed image of the display panel into left-handed circularly polarized light and right-handed circularly polarized light. The liquid crystal polymer layer includes a plurality of strip-shaped liquid crystal sub-layers having equal widths. When the phase film substrate is being attached to the display panel, a central axis of the phase film substrate is usually aligned with a central axis of the display panel, and then attachment is performed from a middle of the display panel to two sides of the central axis, so that the plurality of strip-shaped liquid crystal sub-layers on the phase film substrate are in one-to-one correspondence with multiple rows of pixel units on the display panel.

However, since the base film of the phase film substrate is made of a flexible material and has certain ductility, two sides of the central axis become longer under the effect of a tensile force during attachment, so that an obvious deformation is generated at the edges of the liquid crystal polymer layer, and the liquid crystal polymer layer and the pixel units on upper and lower sides of the display panel cannot be aligned after the phase film substrate has been attached to the display panel, which causes upper and lower sides of a resulting display device to be prone to display distortion.

Figure 1A:
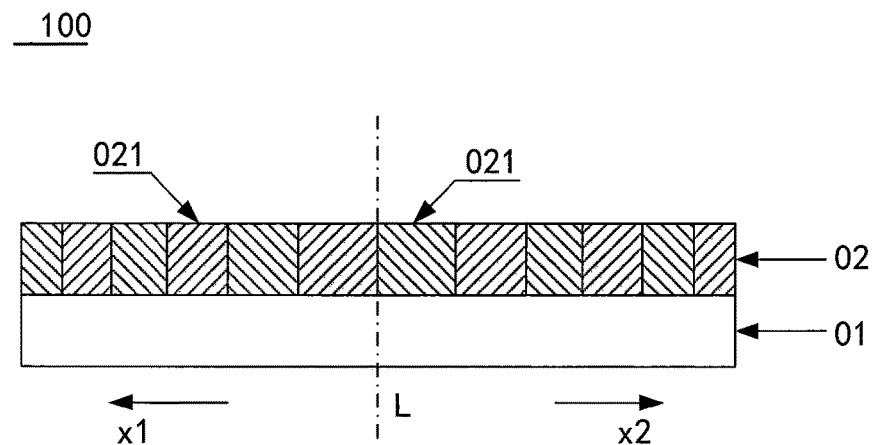
FIG. 1a is a side view of a phase film substrate provided by an embodiment of the present disclosure.
Figure 1B:
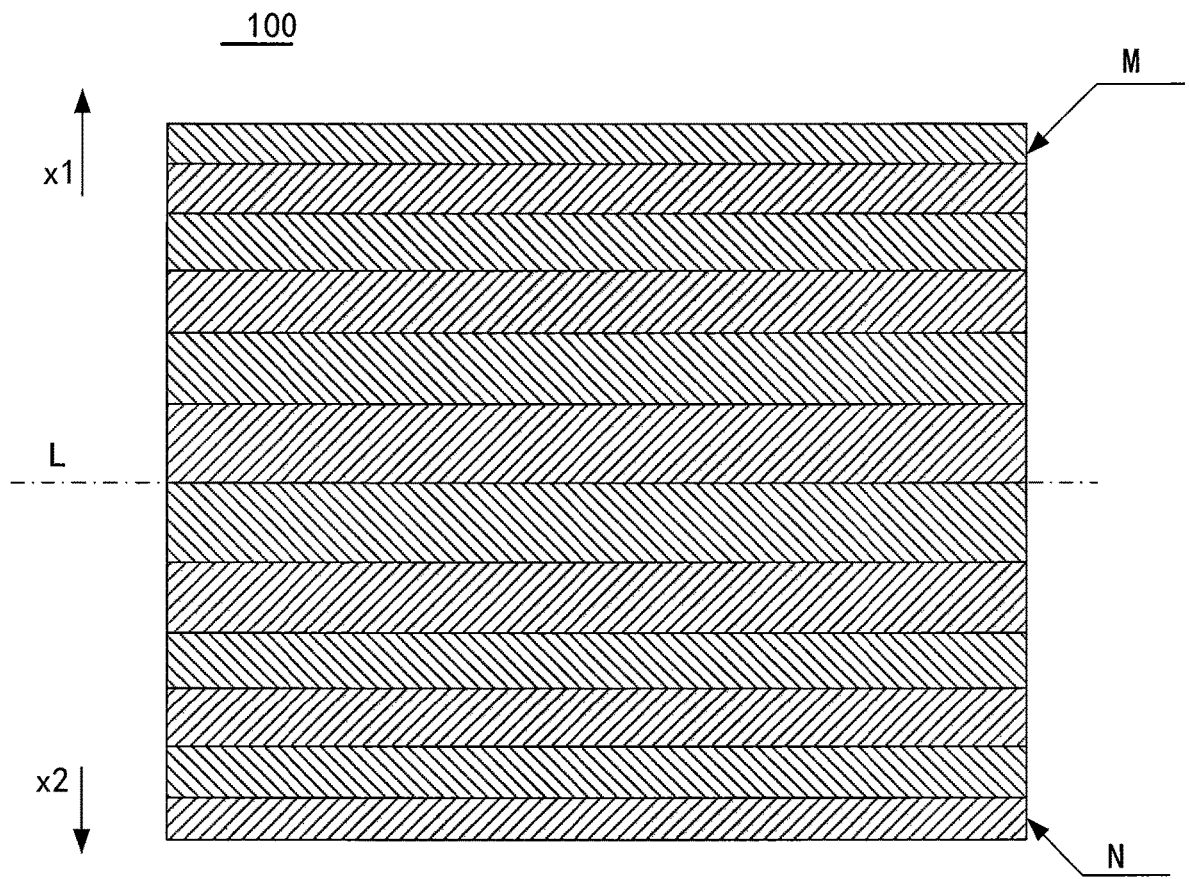
FIG. 1b is a plan view of a phase film substrate provided by an embodiment of the present disclosure.

In view of this, an embodiment of the present disclosure provides a phase film substrate 100 as shown in FIGS. 1a and 1b, wherein FIG. 1a is a side view of the phase film substrate 100, and FIG. 1b is a plan view of the phase film substrate 100. As shown, the phase film substrate 100 comprises a base film 01 and a liquid crystal polymer layer 02 disposed on the base film 01, and the liquid crystal polymer layer 02 may be configured to generate left-handed circularly polarized light and right-handed circularly polarized light.

The liquid crystal polymer layer 02 includes a plurality of strip-shaped liquid crystal sub-layers 021 arranged in parallel in a first direction of the base film 01, and widths of the plurality of strip-shaped liquid crystal sub-layers 021 gradually decrease from a center of the base film 01 to edges of the base film 01 in the first direction. In particular, the first direction is an extension direction of the base film 01 when it is attached to a display panel. For example, as shown in FIG. 1a or FIG. 1b, when the base film 01 is attached to the display panel, its extension directions are force-receiving directions x1 and x2, that is, the first direction is the directions x1 and x2 in FIGS. 1a and 1b. The widths of the plurality of strip-shaped liquid crystal sub-layers 021 gradually decrease from the center of the base film 01 to the edges of the base film 01 in the directions x1 and x2. That is, the widths of the plurality of strip-shaped liquid crystal sub-layers 021 gradually decrease in a direction away from a straight line L in FIGS. 1a and 1b where a second direction resides. The straight line L where the second direction resides is a symmetry axis where the center of the base film 01 is located, and the second direction is perpendicular to the first direction. Optionally, when the display panel is a rectangular display panel, the above base film 01 may be a rectangular base film, and accordingly, the phase film substrate is also rectangular. On the base film 01, the plurality of strip-shaped liquid crystal sub-layers 021 are symmetrically distributed, and a symmetry axis is the straight line L where the center of the base film 01 is located in the second direction. Thus, when the phase film substrate is attached, the central axis (i.e. the straight line L in the second direction) of the phase film substrate may be aligned with the central axis of the display panel, and then attachment is performed from the middle of the display panel to two sides of the central axis. Since the widths of the plurality of strip-shaped liquid crystal sub-layers 021 gradually decrease from the center of the base film 01 towards two sides of the central axis, it can be more effectively ensured that two sides of the central axis of the phase film substrate receive uniform force during attachment. It is to be noted that, in practice, the phase film substrate is usually provided with hundreds even thousands of strip-shaped liquid crystal sub-layers 021, and what are shown in FIG. 1a and FIG. 1b are just illustrative.

Figure 1C:
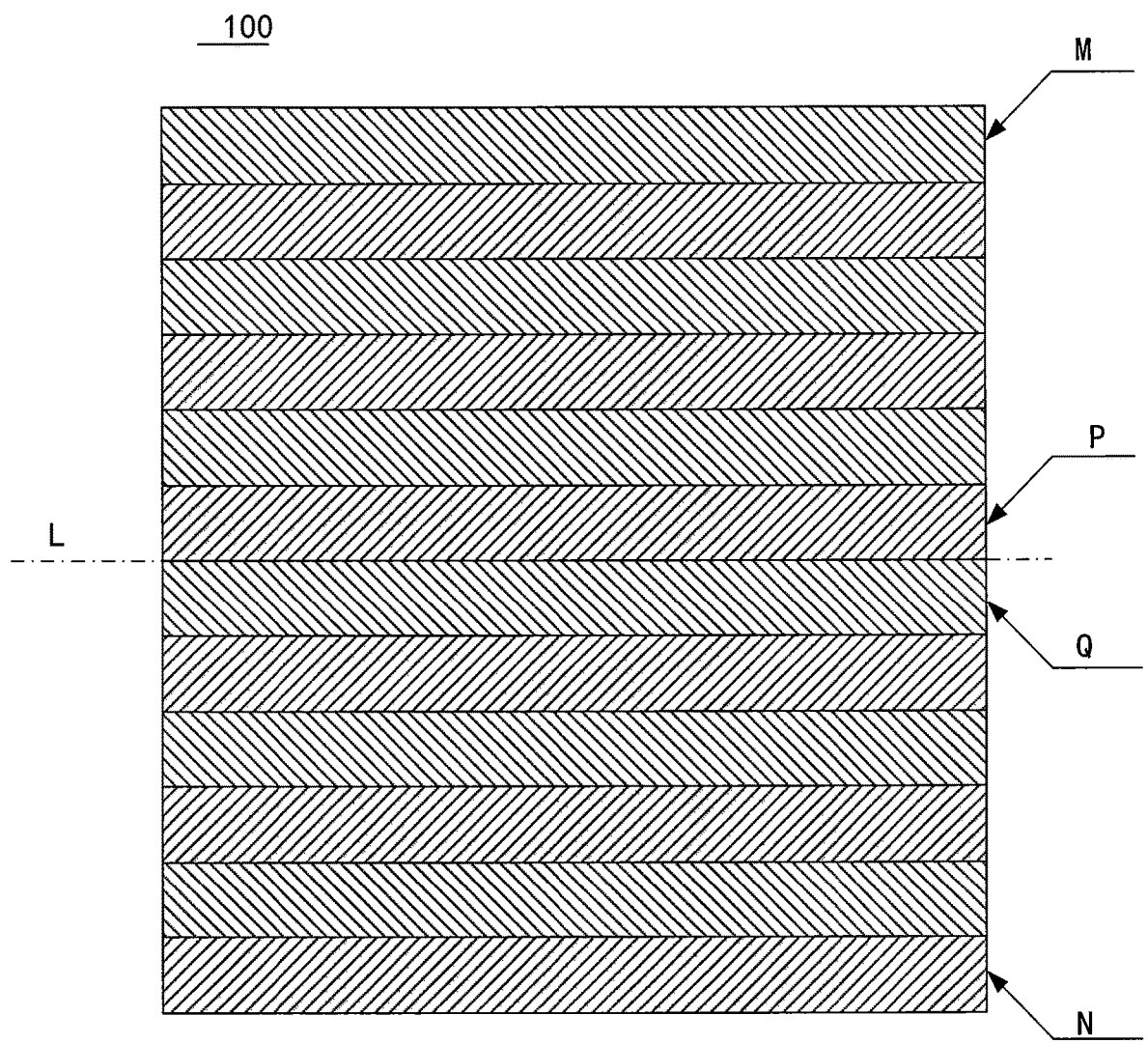
FIG. 1c is a plan view of a phase film substrate provided by an embodiment of the present disclosure when attached to a display panel.

When the phase film substrate is being attached to the display panel, since the base film receives force at two sides of the central axis, the force received by the base film is gradually reduced from the edges towards the central axis. Under the effect of this force, the amounts of deformation of the plurality of strip-shaped liquid crystal sub-layers on the base film are gradually reduced from the edges to the central axis, and the deformation of the strip-shaped liquid crystal sub-layer is usually zero in the central region of the base film. Correspondingly, the widths of the plurality of strip-shaped liquid crystal sub-layers gradually decrease from the center of the base film to two sides of the central axis, so that the widths of the plurality of strip-shaped liquid crystal sub-layers finally formed on the display panel become more uniform and are more closely matched with the pixel units on the display panel. FIG. 1c illustrates a plan view of the phase film substrate 100 when attached to the display panel. In an exemplary embodiment, the width of the strip-shaped liquid crystal sub-layer at the center (such as adjusting liquid crystal sub-layers P and Q in FIG. 1c) is a preset reference width. The closer a width of a strip-shaped liquid crystal sub-layer on the phase film substrate is to said width, the better it will be matched with the display panel. Since the widths of the plurality of strip-shaped liquid crystal sub-layers on the base film gradually decrease from the center of the base film to two sides of the central axis, strip-shaped liquid crystal sub-layers M and N located at the edges of the phase film substrate after attachment (deformation) are both wider than corresponding ones on the phase film substrate before attachment, and the widths thereof are closer to the widths of the strip-shaped liquid crystal sub-layers P and Q located at the center. Therefore, the liquid crystal polymer layers can be effectively aligned at the edges of the display panel, which can improve the matching degree between the strip-shaped liquid crystal sub-layers at the edges and the display panel.

In practice, the display panel comprises multiple rows of pixel units, each row of pixel units includes a plurality of pixel units, and each of the pixel units may include at least two sub-pixels of different colors. For example, each pixel unit may include sub-pixels of three colors, which are a red sub-pixel for emitting red light, a green sub-pixel for emitting green light, and a blue sub-pixel for emitting blue light, respectively. The phase film substrate needs to be matched with the multiple rows of pixel units. In an embodiment of the present disclosure, the width of each strip-shaped liquid crystal sub-layer matches the width of one or more rows of pixel units on the display panel. For example, when the width of each strip-shaped liquid crystal sub-layer matches the width of m rows of pixel units on the display panel, where m is an integer not less than 1, the width of each strip-shaped liquid crystal sub-layer is less than or equal to a preset width threshold that is equal to a sum of widths of m rows of pixel units in the display panel (that is, m times the sum of widths of an opening and a light-shielding region of a pixel unit, wherein the opening is also referred to as a light-transmitting region, and the light-shielding region is usually a region where a black matrix between every two adjacent light-transmitting regions is located). When m is 1, the width of each strip-shaped liquid crystal sub-layer is less than or equal to a preset width threshold that is equal to the width of one row of pixel units in the display panel. When the width of each strip-shaped liquid crystal sub-layer matches the width of one row of pixel units on the display panel, the display panel has high resolution, thus a 3D image seen by human eyes has better effect.

In an exemplary embodiment, the widths of the plurality of strip-shaped liquid crystal sub-layers decrease linearly from the center of the base film in the first direction.

In case the display panel includes multiple rows of pixel units, and the multiple rows of pixel units have equal widths, supposing that the plurality of strip-shaped liquid crystal sub-layers are in one-to-one correspondence with the multiple rows of pixel units, the width of the strip-shaped liquid crystal polymer layer located at the center of the base film is equal to the width of one row of pixel units, wherein the strip-shaped liquid crystal sub-layer located at the center of the base film is a strip-shaped liquid crystal sub-layer closest to the center of the base film.

As used herein, the term "width" refers to a dimension in the first direction described above. Further, as used herein, the row direction of pixel units refers to the second direction perpendicular to the first direction, and each of the strip-shaped liquid crystal sub-layers extends in the second direction.

In an exemplary embodiment, when the plurality of strip-shaped liquid crystal sub-layers are in one-to-one correspondence with the multiple rows of pixel units, a width $D_i$ of an i-th strip-shaped liquid crystal sub-layer which is arranged in the first direction from the center of the base film and not located at the center of the base film may satisfy the following width calculation formula:

$$D_i = D - i*2(p-a)/[(n+1)*n],$$

wherein D is the width of the strip-shaped liquid crystal sub-layer located at the center of the base film, p is the width of one pixel unit, a is the width of the opening of one pixel unit, wherein the direction in which the width of the strip-shaped liquid crystal sub-layer located at the center of the base film resides, the direction in which the width of one pixel unit resides, and the direction in which the width of the opening of one pixel unit resides are all parallel to the first direction, and n is a total number of strip-shaped liquid crystal sub-layers located on a side of the straight line L and not located at the center of the base film.

The number of rows of pixel units located at the center of the display panel usually involves two cases. In one case, the display panel includes odd-numbered rows of pixel units, so there is one row of pixel units located at the center of the display panel. Correspondingly, there is one strip-shaped liquid crystal sub-layer located at the center of the base film, the symmetry axis of the strip-shaped liquid crystal sub-layer located at the center of the base film and the symmetry axis (i.e. the straight line L in which the second direction resides in FIG. 1a and FIG. 1b) of the base film is collinear, and its width is equal to the width of one row of pixel units. In the other case, the display panel includes even-numbered rows of pixel units, so there are two rows of pixel units located at the center of the display panel. Correspondingly, there are two strip-shaped liquid crystal sub-layers located at the center of the base film, the two strip-shaped liquid crystal sub-layers located at the center of the base film are symmetrically distributed at two sides of the symmetry axis (i.e. the straight line L in which the second direction resides in FIG. 1a and FIG. 1b) of the base film, and their widths are equal to the width of one row of pixel units, respectively.

Figure 2:
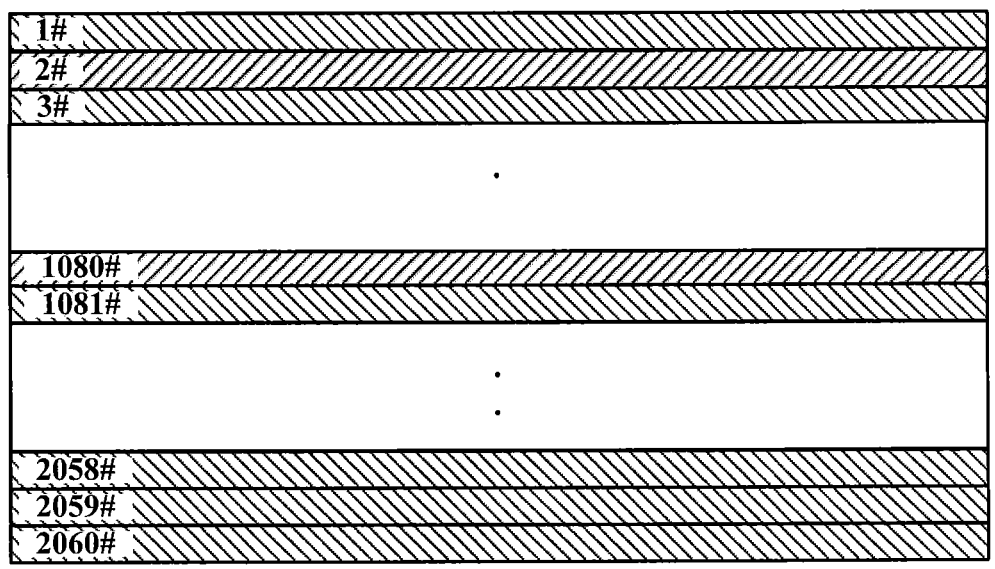
FIG. 2 is a plan view of another phase film substrate provided by an embodiment of the present disclosure.

As shown in FIG. 2, taking a 55-inch phase film substrate as an example, the phase film substrate is matched with a 55-inch display panel. The display panel corresponding to the phase film substrate may include 2160 rows of pixel units, and the strip-shaped liquid crystal sub-layers are in one-to-one correspondence with the rows of pixel units, thus the number of corresponding strip-shaped liquid crystal sub-layers is also 2160. 1080-th and 1081-th strip-shaped liquid crystal sub-layers are located at the center of the base film, so there are 2158 strip-shaped liquid crystal sub-layers in addition to the two strip-shaped liquid crystal sub-layers located at the center of the base film. For either side of the symmetry axis (i.e. the straight line L in which the second direction resides in FIG. 1a and FIG. 1b) of the base film, the number of strip-shaped liquid crystal sub-layers arranged from the center of the base film to the edges and not located at the center of the base film is 1079, that is, n=1079. Assuming that the maximum processing precision error of the phase film substrate is 0.134 mm, and the maximum processing error is the value of (p−a), the widths of the strip-shaped liquid crystal sub-layers progressively decrease from 0.315 mm at the center of the base film to 0.31475 mm at the edges of the base film in terms of 1080 rows. That is, the widths of the 1080-th and the 1081-th strip-shaped liquid crystal sub-layers are 0.315 mm, and the widths of the first and the 2160-th strip-shaped liquid crystal sub-layers are 0.31475 mm. For example, according to the above calculation formula, the first and the 2160-th strip-shaped liquid crystal sub-layers in FIG. 2 are the 1079-th strip-shaped liquid crystal sub-layers arranged successively from the center of the base film to the edges and not located at the center of the base film, thus it can be obtained that the widths $D_{1079}$ of the first and the 2160-th strip-shaped liquid crystal sub-layers are: $D_{1079} = D − 1079*2*0.134/(1080*1079)$, or $D = D_{1079} + 1079*2*0.134/(1080*1079)$.

In an exemplary embodiment, the plurality of strip-shaped liquid crystal sub-layers include a plurality of left-handed liquid crystal sub-layers configured to generate left-handed circularly polarized light and a plurality of right-handed liquid crystal sub-layers configured to generate right-handed circularly polarized light. The plurality of left-handed liquid crystal sub-layers and the plurality of right-handed liquid crystal sub-layers are arranged in parallel and alternately in the first direction. This ensures that the left-hand circularly polarized light and the right-handed circularly polarized light transmitted from the display panel are distributed more uniformly, and the display panel has better resolution.

Figure 3:
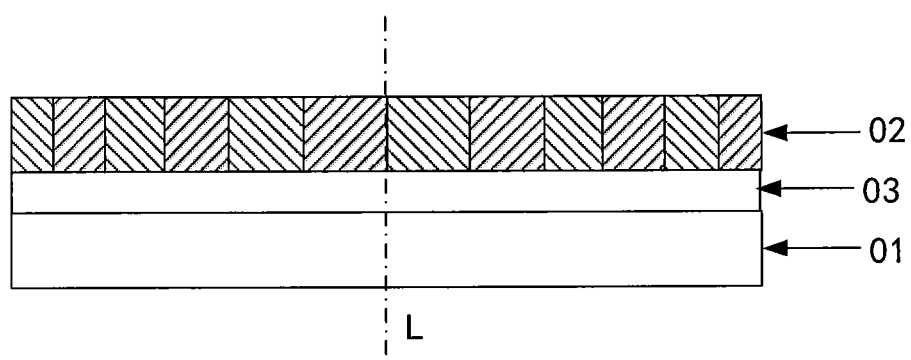
FIG. 3 is a schematic structural diagram of a phase film substrate provided by an embodiment of the present disclosure.

In a manufacturing process of the above phase film substrate, a liquid crystal polymer layer is obtained by aligning a liquid crystal polymer. The liquid crystal polymer may be directly aligned, and the resulting phase film substrate may be a two-layer structure, as shown in FIG. 1a. Alternatively, an alignment layer may be formed on the base film, a liquid crystal polymer is then coated on the alignment layer, and the liquid crystal polymer is aligned. The resulting phase film substrate is a three-layer structure as shown in FIG. 3. In this case, as shown in FIG. 3, the phase film substrate 100 further comprises an alignment layer 03 disposed between the base film 01 and the liquid crystal polymer layer 02. The alignment layer 03 is configured to align the liquid crystal polymer.

In the phase film substrate provided by an embodiment of the present disclosure, since the liquid crystal polymer layer includes a plurality of strip-shaped liquid crystal sub-layers arranged in parallel in the first direction of the base film, and the widths of the plurality of strip-shaped liquid crystal sub-layers gradually decrease from the center of the base film to the edges of the base film in the first direction, when the phase film substrate is attached to the display panel, the base film receives force at two edges in the first direction, thus the force received by the base film is gradually reduced from the edges to the center in the first direction. Under the effect of this force, the widths of the plurality of strip-shaped liquid crystal sub-layers on the base film become more uniform and are more closely matched with the pixel units on the display panel, so that the widths of the strip-shaped liquid crystal polymer layers located at the edges can be effectively aligned with the edges of the display panel, which can improve the matching degree between the strip-shaped liquid crystal sub-layers at the edges and the edges of the display panel, thereby reducing display distortion at the edges of the display device. Further, since the display distortion at the edges of the display device is reduced, the viewing angle defect of the display device at the edges is reduced accordingly.

Figure 4:
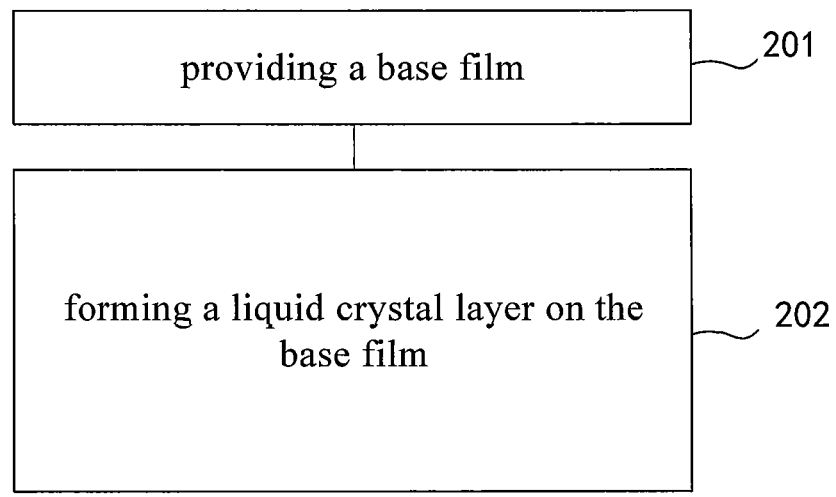
FIG. 4 is a flow chart of a manufacturing method for a phase film substrate according to an exemplary embodiment.

Correspondingly, an embodiment of the present disclosure provides a manufacturing method for a phase film substrate. As shown in FIG. 4, the manufacturing method comprises providing a base film at step 201. The manufacturing method further comprises forming a liquid crystal polymer layer on the base film at step 202. The liquid crystal polymer layer includes a plurality of strip-shaped liquid crystal sub-layers arranged in parallel in a first direction of the base film, and the widths of the plurality of strip-shaped liquid crystal sub-layers are gradually decrease from the center of the base film to edges of the base film in the first direction. Particularly, the first direction is a direction in which the phase film substrate extends when it is attached to a display panel.

In the manufacturing method for a phase film substrate provided by an embodiment of the present disclosure, since the liquid crystal polymer layer includes a plurality of strip-shaped liquid crystal sub-layers arranged in parallel in the first direction of the base film, and the widths of the plurality of strip-shaped liquid crystal sub-layers gradually decrease from the center of the base film to the edges of the base film in the first direction, when the phase film substrate is being attached to the display panel, the force is received at two edges in the first direction, thus the force received by the base film is gradually reduced from the edges to the center in the first direction. Under the effect of this force, the widths of the plurality of strip-shaped liquid crystal sub-layers on the base film become more uniform and are more closely matched with the pixel units on the display panel, so that the widths of the strip-shaped liquid crystal sub-layers located at the edges can be effectively aligned with the edges of the display panel, which can improve the matching degree of the strip-shaped liquid crystal sub-layers at the edges and the edges of the display panel, thereby reducing display distortion at the edges of the display device.

In embodiments of the present disclosure, the liquid crystal polymer layer may be formed on the base film in various ways.

Figure 5A:
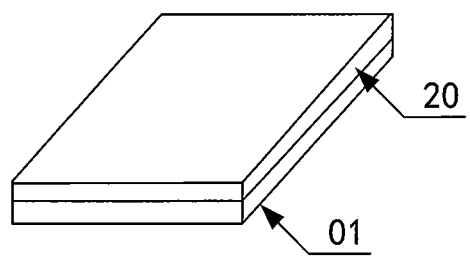
FIGS. 5a-5b are schematic views illustrating a manufacturing process of a phase film substrate according to an exemplary embodiment.
Figure 5B:
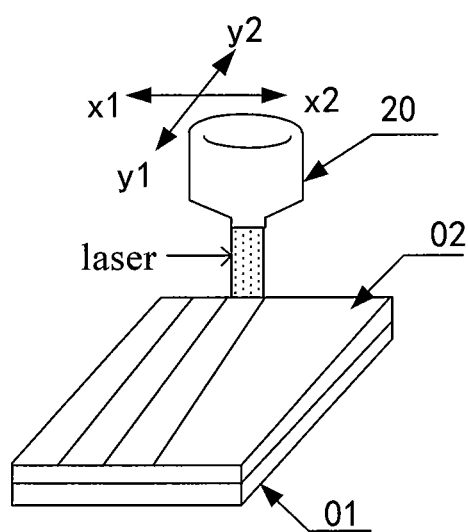

FIGS. 5a-5b illustrate a way of forming a liquid crystal polymer layer on the base film. As shown in FIG. 5a, a liquid crystal polymer is first formed on the base film 01. For example, a liquid crystal polymer 20 may be formed on the base film 01 by coating. Then, as shown in FIG. 5b, different regions of the liquid crystal polymer 20 are irradiated with laser light having a polarization direction of 45 degrees and laser light having a polarization direction of W degrees respectively, so that the liquid crystal polymer forms a liquid crystal polymer layer. The resulting phase film substrate may be as shown in FIG. 1a. Particularly, W may be −45 or 135, a left-handed liquid crystal sub-layer configured to generate left-handed circularly polarized light is formed on a region irradiated with laser light having a polarization direction of 45 degrees, and a right-handed liquid crystal sub-layer configured to generate right-handed circularly polarized light is formed on a region irradiated with laser light having a polarization direction of W degrees. Specifically, as shown in FIG. 5b, a laser 20 may be employed to irradiate different regions of the liquid crystal polymer with laser light having a polarization direction of 45 degrees and laser light having a polarization direction of W degrees respectively in different time periods. Alternatively, in other exemplary embodiments, two lasers may be employed, which emit laser light having a polarization direction of 45 degrees and laser light having a polarization direction of W degrees respectively, and irradiate different regions of the liquid crystal polymer during the same period.

Specifically, the laser can move in a reference plane parallel to the plane in which the liquid crystal polymer is located to realize scanning of laser light at different positions of the liquid crystal polymer, as shown in FIG. 5b. The laser can move in y1, y2 (i.e. a negative direction of y1), x1, and x2 (i.e. a negative direction of x1) to realize movement of the laser on all sides above the liquid crystal polymer. Alternatively, the laser can also move in a direction perpendicular to the reference plane, or the laser emission intensity thereof may be adjust to realize adjustment to the width of each strip-shaped liquid crystal sub-layer.

In an exemplary embodiment of the present disclosure, the distance between the laser generating laser light and the base film gradually decreases from the center of the base film to the edges of the base film in the first direction. Alternatively, the luminous flux of the laser light irradiating on the liquid crystal polymer gradually decreases from the center of the base film to the edges of the base film in the first direction. As a result, the widths of the plurality of strip-shaped liquid crystal sub-layers finally formed can gradually decrease from the center of the base film to the edges of the base film in the first direction. Of course, the distance between the laser and the base film and the luminous flux of the laser light irradiating on the liquid crystal polymer may also be adjusted as needed, which will not be described in detail in embodiments of the present disclosure.

Since laser light has a high degree of collimation, it is not necessary to employ a mask when laser light is used for alignment, which greatly saves the manufacturing cost. Moreover, the liquid crystal polymer is directly aligned by laser light, so there is no need to form an alignment film on the base film, which simplifies the manufacturing processes and also saves the manufacturing cost.

Figure 6A:
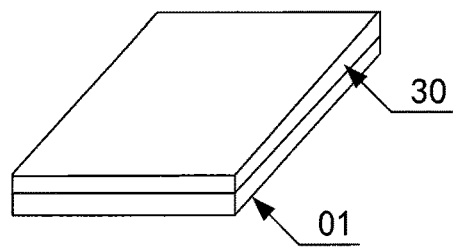
FIGS. 6a-6d are schematic views illustrating a manufacturing process of another phase film substrate according to an exemplary embodiment.
Figure 6B:
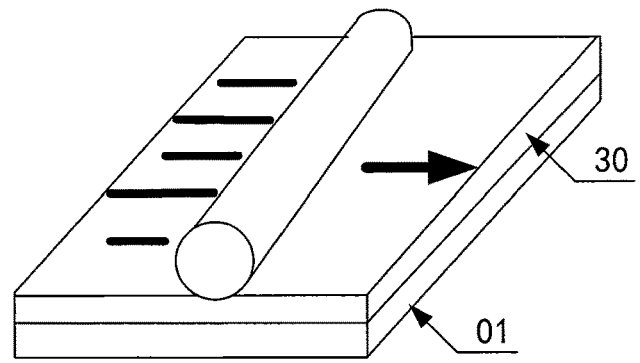
Figure 6C:
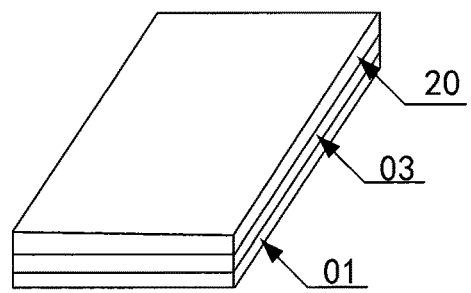
Figure 6D:
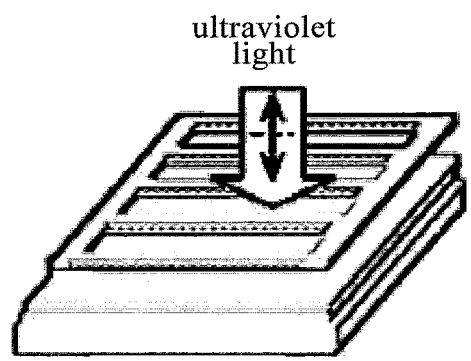

FIGS. 6a-6d illustrate another way of forming a liquid crystal polymer layer according to an embodiment of the present disclosure. Firstly, as shown in FIG. 6a, an alignment film polymer layer 30 is formed on the base film 01. For example, an alignment film polymer layer 30 may be formed on the base film 01 by coating. The alignment film polymer layer may be made of polyimide (PI). Then, as shown in FIG. 6b, the alignment film polymer layer 30 on the base film 01 is subjected to rubbing alignment to obtain an alignment layer. For example, the rubbing alignment process may include a rubbing process and a drying process after rubbing. The rubbing process can be achieved by a friction roller. Next, as shown in FIG. 6c, a liquid crystal polymer 20 where ultraviolet light alignment can be performed is formed on an alignment layer 03 of the base film 01. For example, the liquid crystal polymer 20 may be formed on the alignment layer 03 by coating. Alternatively, the liquid crystal polymer 20 may be pre-dried (i.e. drying by heating) after the polymer layer 20 has been formed so to improve the alignment effect. Finally, as shown in FIG. 6d, different regions of the liquid crystal polymer 20 are subjected to exposure with a polarization direction of 45 degrees and exposure with a polarization direction of W degrees respectively using ultraviolet light, so that the liquid crystal polymer 20 forms a liquid crystal polymer layer. Alternatively, after the liquid crystal polymer layer has been formed, the liquid crystal polymer layer may be dried to improve the alignment effect. The structure of a resulting phase film substrate may be as shown in FIG. 3.

Figure 7A:
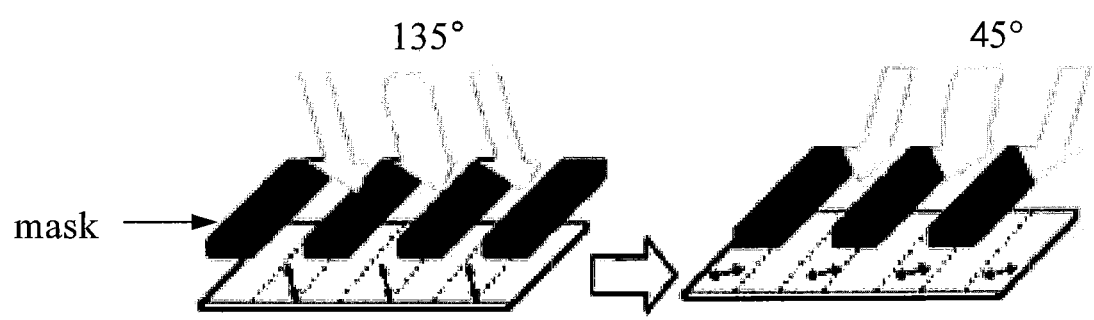
FIGS. 7a-7b are schematic views illustrating a manufacturing process of a further phase film substrate according to an exemplary embodiment.
Figure 7B:
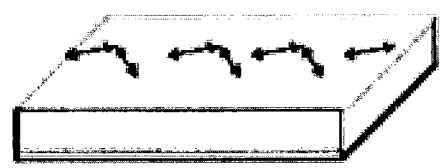

FIGS. 7a-7b illustrate a further way of forming a liquid crystal polymer layer according to an embodiment of the present disclosure. Firstly, a photosensitive alignment layer is formed on the base film, and the photosensitive alignment layer may be an alignment layer to which a photosensitive substance is added. For example, the photosensitive substance may be a photoisomerization substance such as a diarylethene molecule and an azobenzene molecule, or a photocrosslinking substance such as laurate, coumarin and styrylpyridine. The photosensitive alignment layer may be made of PI mixed with a photosensitive substance. The photosensitive alignment layer may be aligned by illumination without the need for rubbing alignment. Then, as shown in FIG. 7a, different regions of the photosensitive alignment layer are subjected to exposure with a polarization direction of 45 degrees and an exposure with a polarization direction of W degrees respectively using ultraviolet light, where W is −45 or 135. FIG. 7a illustrates two exposures, and both exposures need to employ a mask. Specifically, FIG. 7a illustrates an example in which a first region of the photosensitive alignment layer is first exposed to exposure with a polarization direction of 135 degrees using ultraviolet light, and a second region of the photosensitive alignment layer is then subjected to exposure with a polarization direction of 45 degrees using ultraviolet light. Next, a liquid crystal polymer is coated on an exposed photosensitive alignment layer. Finally, as shown in FIG. 7b, the liquid crystal polymer is arranged and aligned on the different exposed regions described above and optionally pre-dried and cured so that the liquid crystal polymer forms a liquid crystal polymer layer.

In the above-described way of forming a liquid crystal polymer layer, a left-handed liquid crystal sub-layer configured to generate left-handed circularly polarized light is formed on a region irradiated with ultraviolet light having a polarization direction of 45 degrees, and a right-handed liquid crystal sub-layer configured to generate right-handed circularly polarized light is formed on a region irradiated with ultraviolet light having a polarization direction of W degrees, where W is −45 or 135. For example, a light emitter may be used to irradiate different regions of the base film with ultraviolet light having a polarization direction of 45 degrees and ultraviolet light having a polarization direction of 135 degrees respectively in different time periods.

Specifically, the light emitter can move in a reference plane parallel to the plane in which the liquid crystal polymer is located to realize scanning of ultraviolet light in different regions of the base film, as shown in FIG. 5b. The light emitter can move in y1, y2 (i.e. a negative direction of y1), x1, and x2 (i.e. a negative direction of x1) to realize movement of the light emitter on all sides above the base film.

The liquid crystal polymer in embodiments of the present disclosure is a photo-alignment polymer, which may include various types of materials, such as RM257, having a molecular formula of $C_{33}H_{32}O_{10}$.

In an exemplary embodiment, different regions of the base film include a first region and a second region. The first region and the second region are arranged in parallel and alternately in the first direction to form a left-handed liquid crystal sub-layer and a right-handed liquid crystal sub-layer arranged in parallel and alternately in the first direction respectively. A left-handed liquid crystal sub-layer configured to generate left-handed circularly polarized light may be formed on the first region, and a right-handed liquid crystal sub-layer configured to generate right-handed circularly polarized light may be formed on the second region, or vice versa.

It is to be noted that, in order to achieve the effect that the widths of the plurality of strip-shaped liquid crystal sub-layers gradually decrease from the center of the base film to the edges of the base film in the first direction, in the ways shown in FIGS. 6a-6d and 7a-7b, ultraviolet light may be irradiated onto different regions by two mask having shapes matched with the first region and the second region respectively. For example, one mask includes a plurality of strip-shaped light-transmitting regions arranged in parallel in the first direction whose widths gradually decrease, and the other mask includes a plurality of strip-shaped light-transmitting regions arranged in parallel in the first direction whose widths gradually decrease.

In another exemplary embodiment, in order to reduce use of the mask, a mask including a plurality of strip-shaped light-transmitting regions with equal widths may be used, and the effect that the widths of the plurality of strip-shaped liquid crystal sub-layers gradually decrease from the center of the base film to the edges of the base film in the first direction is achieved by grayscale exposure. Specifically, the light emitter can move in a direction perpendicular to the reference plane, or its ultraviolet light emission intensity can be adjusted to achieve adjustment to the width of each liquid crystal sub-layer. In an embodiment of the present disclosure, the distance between the light emitter that generates ultraviolet light and the base film gradually decreases from the center of the base film to the edges of the base film in the first direction. Alternatively, the luminous flux of the ultraviolet light irradiating on the liquid crystal polymer gradually decreases from the center of the base film to the edges of the base film in the first direction. As a result, the widths of the plurality of strip-shaped liquid crystal sub-layers finally formed can gradually decrease from the center of the base film to the edges of the base film in the first direction. Of course, the distance between the light emitter and the base film and the light flux of the ultraviolet light irradiating on the liquid crystal polymer can also be adjusted as needed, which will not be described in detail in embodiments of the present disclosure.

In an exemplary embodiment, the display panel includes multiple rows of pixel units, and the width of any of the first region and the second region matches the width of one or more rows of pixel units on the display panel. For example, when the width of each strip-shaped liquid crystal sub-layer matches the width of m rows of pixel units on the display panel, where m is an integer not less than 1, the width of each region is less than or equal to a preset width threshold that is equal to the sum of widths of the m rows of pixel units in the display panel. When m is 1, the width of each region is less than or equal to the preset width threshold equal to the width of one row of pixel units on the display panel. When the width of each region matches the width of one row of pixel units on the display panel, the m width of a strip-shaped liquid crystal sub-layer formed thereon matches the width of one row of pixel units on the display panel. Thus, the display panel has high resolution, and a 3D image seen by human eyes has better effect.

In an exemplary embodiment, the display panel includes multiple rows of pixel units having the same width, and the plurality of strip-shaped liquid crystal sub-layers are in one-to-one correspondence with the multiple rows of pixel units. The strip-shaped liquid crystal sub-layer located at the center of the base film is a strip-shaped liquid crystal sub-layer closest to a straight line L where the center of the base film is located.

The width Di of an i-th strip-shaped liquid crystal sub-layer which is successively arranged from the center of the base film to the edges in the first direction and not located at the center of the base film satisfies a width calculation formula:

$$Di=D-i*2(p-a)/[(n+1)*n],$$

wherein D is the width of the strip-shaped liquid crystal sub-layer located at the center of the base film, p is the width of one pixel unit, a is the width of an opening of one pixel unit, wherein the direction where the width of the strip-shaped liquid crystal sub-layer located at the center of the base film resides, the direction where the width of one pixel unit resides, and the direction where the width of an opening of one pixel unit resides are all parallel to the first direction, and n is a total number of strip-shaped liquid crystal sub-layers located on a side of the straight line L and not located at the center of the base film.

In the manufacturing method for a phase film substrate provided by an embodiment of the present disclosure, since the liquid crystal polymer layer includes a plurality of strip-shaped liquid crystal sub-layers arranged in parallel in the first direction of the base film, and the widths of the plurality of strip-shaped liquid crystal sub-layers gradually decrease from the center of the base film to the edges of the base film in the first direction, when the phase film substrate is being attached to the display panel, the base film receives force at two edges in the first direction, thus the force received by the base film is gradually reduced from the edges to the center in the first direction. Under the effect of this force, the widths of the plurality of strip-shaped liquid crystal sub-layers on the base film become more uniform and are more closely matched with the pixel units on the display panel, so that the widths of the strip-shaped liquid crystal sub-layers located at the edges can be effectively aligned with the edges of the display panel, which can improve the matching degree between the strip-shaped liquid crystal sub-layers at the edges and the edges of the display panel, thereby reducing display distortion at the edges of the display device.

Those skilled in the art can clearly understand that for the convenience and brevity of description, specific steps of the method described above may refer to corresponding processes in the foregoing embodiments of the phase film substrate, and details are not described herein again.

Correspondingly, an embodiment of the present disclosure further provides a display device comprising a display panel and a phase film substrate disposed on a light exit surface of the display panel, wherein the phase film substrate is any phase film substrate 100 provided in the foregoing embodiments.

The display device may be any product or component having a display function such as a liquid crystal panel, an electronic paper, an OLED panel, a mobile phone, a tablet computer, a television, a display, a notebook computer, a digital photo frame, a navigator, and the like.

Other embodiments of the present disclosure will be readily conceived by those skilled in the art after considering the specification and practicing the present disclosure. The present application is intended to cover any variations, usages, or adaptations of the present disclosure, which adhere to the general principles of the disclosure and include common general knowledge or common technical measures in the art that are not disclosed in the present disclosure. The specification and embodiments are to be regarded as illustrative only, and the true range and spirit of the present disclosure are defined by the claims.

It is to be understood that the present disclosure is not limited to the precise structures that have been described above and shown in the drawings, and various modifications and variations can be made without departing from the scope thereof. The scope of the present disclosure is only defined by the appended claims.

The invention claimed is:

1. A phase film substrate for being attached to a display panel, the phase film substrate comprising:
   a base film, and
   a liquid crystal polymer layer on the base film,
   wherein the liquid crystal polymer layer comprises a plurality of strip-shaped liquid crystal sub-layers arranged in parallel in a first direction of the base film,
   wherein respective widths of the plurality of strip-shaped liquid crystal sub-layers in the first direction gradually decrease from a center of the base film to edges of the base film in the first direction,
   wherein the phase film substrate is configured to receive force to extend in the first direction in response to being attached to the display panel,
   wherein the first direction is parallel to a plane in which the phase film substrate resides, and
   wherein the respective widths of the plurality of strip-shaped liquid crystal sub-layers in the first direction decrease linearly from the center of the base film to the edges of the base film in the first direction.

2. The phase film substrate according to claim 1,
   wherein the display panel comprises a plurality of rows of pixel units arranged in parallel in the first direction,
   wherein the plurality of rows of pixel units have equal widths in the first direction, and
   wherein each of the plurality of strip-shaped liquid crystal sub-layers corresponds to m rows of pixel units of the plurality of rows of pixel units,
   wherein m is an integer not less than 1.

3. The phase film substrate according to claim 2,
   wherein m=1,
   wherein a width of a strip-shaped liquid crystal sub-layer of the plurality of strip-shaped liquid crystal sub-layers at the center of the base film in the first direction is equal to a width of one row of pixel units of the plurality of rows of pixel units in the first direction,
   wherein the strip-shaped liquid crystal sub-layer at the center of the base film comprises a strip-shaped liquid crystal sub-layer closest to the center of the base film,
   wherein a width $D_i$ of an i-th strip-shaped liquid crystal sub-layer of the plurality of strip-shaped liquid crystal sub-layers in the first direction which is successively arranged from the center of the base film to the edges of the base film in the first direction and not at the center of the base film satisfies a width calculation formula:

$$D_i = D - i*2(p-a)/[(n+1)*n],$$

wherein D is the width of the strip-shaped liquid crystal sub-layer at the center of the base film in the first direction,
   wherein p is a width of one pixel unit in the first direction,
   wherein a is a width of an opening of one pixel unit in the first direction, and
   wherein n is a total number of strip-shaped liquid crystal sub-layers of the plurality of strip-shaped liquid crystal sub-layers which are on a side of the center of the base film in the first direction and not at the center of the base film.

4. The phase film substrate according to claim 1,
   wherein the base film comprises a rectangular base film,
   wherein the plurality of strip-shaped liquid crystal sub-layers are symmetrically distributed,
   wherein a symmetry axis comprises a straight line in a second direction where the center of the base film resides, and
   wherein the second direction is perpendicular to the first direction.

5. The phase film substrate according to claim 1,
   wherein the plurality of strip-shaped liquid crystal sub-layers comprise a plurality of left-handed liquid crystal sub-layers configured to generate left-handed circularly polarized light and a plurality of right-handed liquid crystal sub-layers configured to generate right-handed circularly polarized light, and
   wherein the plurality of left-handed liquid crystal sub-layers and the plurality of right-handed liquid crystal sub-layers are arranged in parallel and alternately in the first direction.

6. The phase film substrate according to claim 1, further comprising:
   an alignment layer between the base film and the liquid crystal polymer layer.

7. A display device comprising a display panel and a phase film substrate attached to a light exit surface of the display panel,
wherein the phase film substrate is the phase film substrate according to claim 1.

8. The display device according to claim 7,
wherein the display panel comprises a plurality of rows of pixel units arranged in parallel in the first direction,
wherein the plurality of rows of pixel units have equal widths in the first direction,
wherein each of the plurality of strip-shaped liquid crystal sub-layers corresponds to m rows of pixel units of the plurality of rows of pixel units, and
wherein m is an integer not less than 1.

9. The display device according to claim 8,
wherein m=1,
wherein a width of a strip-shaped liquid crystal sub-layer of the plurality of strip-shaped liquid crystal sub-layers at the center of the base film in the first direction is equal to a width of one row of pixel units of the plurality of rows of pixel units in the first direction,
wherein the strip-shaped liquid crystal sub-layer at the center of the base film is a strip-shaped liquid crystal sub-layer closest to the center of the base film,
wherein a width Di of an i-th strip-shaped liquid crystal sub-layer of the plurality of strip-shaped liquid crystal sub-layers in the first direction which is successively arranged from the center of the base film to the edges of the base film in the first direction and not at the center of the base film satisfies a width calculation formula:

$$Di=D-i*2(p-a)/[(n+1)*n],$$

wherein D is the width of the strip-shaped liquid crystal sub-layer at the center of the base film in the first direction,
wherein p is a width of one pixel unit in the first direction,
wherein a is a width of an opening of one pixel unit in the first direction, and
wherein n is a total number of strip-shaped liquid crystal sub-layers of the plurality of strip-shaped liquid crystal sub-layers which are on a side of the center of the base film in the first direction and not at the center of the base film.

10. A method for manufacturing a phase film substrate, the phase film substrate being configured to be attached to a display panel, the method comprising:
providing a base film; and
forming a liquid crystal polymer layer on the base film,
wherein the liquid crystal polymer layer comprises a plurality of strip-shaped liquid crystal sub-layers arranged in parallel in a first direction of the base film,
wherein respective widths of the plurality of strip-shaped liquid crystal sub-layers in the first direction gradually decrease from a center of the base film to edges of the base film in the first direction,
wherein the phase film substrate is configured to receive force and extend in the first direction in response to being attached to the display panel,
wherein the first direction is parallel to a plane in which the phase film substrate resides, and
wherein the respective widths of the plurality of strip-shaped liquid crystal sub-layers in the first direction decrease linearly from the center of the base film to the edges of the base film in the first direction.

11. The method according to claim 10, wherein said forming a liquid crystal polymer layer on the base film comprises:
forming a liquid crystal polymer on the base film; and
irradiating different regions of the liquid crystal polymer with laser light having a polarization direction of 45 degrees and laser light having a polarization direction of W degrees respectively, such that the liquid crystal polymer forms liquid crystal polymer layers configured to generate left-handed circularly polarized light and right-handed circularly polarized light respectively,
wherein W comprises one of −45 and 135.

12. The method according to claim 11, wherein a distance between a laser that generates the laser light and the base film gradually decreases from the center of the base film to the edges of the base film in the first direction.

13. The method according to claim 11, wherein a luminous flux of laser light irradiating on the liquid crystal polymer gradually decreases from the center of the base film to the edges of the base film in the first direction.

14. The method according to claim 11,
wherein the different regions include a first region and a second region, the first region and the second region being arranged in parallel and alternately in the first direction.

15. The method according to claim 10, wherein said forming a liquid crystal polymer layer on the base film comprises:
forming an alignment film polymer layer on the base film;
performing rubbing alignment on the alignment film polymer layer to generate an alignment layer;
forming, on the alignment layer, a liquid crystal polymer where ultraviolet light alignment can be performed; and
subjecting different regions of the liquid crystal polymer to exposure with a polarization direction of 45 degrees and exposure with a polarization direction of W degrees respectively using ultraviolet light, such that the liquid crystal polymer forms liquid crystal polymer layers configured to generate left-handed circularly polarized light and right-handed circularly polarized light respectively,
wherein W comprises one of −45 and 135.

16. The method according to claim 15, wherein a distance between a light emitter that generates the ultraviolet light and the base film gradually decreases from the center of the base film to the edges of the base film in the first direction.

17. The method according to claim 15, wherein a luminous flux of the ultraviolet light irradiating on the liquid crystal polymer layer gradually decreases from the center of the base film to the edges of the base film in the first direction.

18. The method according to claim 10, wherein said forming a liquid crystal polymer layer on the base film comprises:
forming a photosensitive alignment layer on the base film;
subjecting different regions of the photosensitive alignment layer to exposure with a polarization direction of 45 degrees and exposure with a polarization direction of W degrees respectively using ultraviolet light, wherein W comprises one of −45 and 135;
forming a liquid crystal polymer on the photosensitive alignment layer after exposure; and
curing the liquid crystal polymer such that the liquid crystal polymer forms liquid crystal polymer layers configured to generate left-handed circularly polarized light and right-handed circularly polarized light respectively.

\* \* \* \* \*